United States Patent
Jain et al.

(10) Patent No.: US 11,175,709 B2
(45) Date of Patent: Nov. 16, 2021

(54) PER CHIPLET THERMAL CONTROL IN A DISAGGREGATED MULTI-CHIPLET SYSTEM

(71) Applicant: Intel Corporation, Santa Clara, CA (US)

(72) Inventors: Amit Kumar Jain, Portland, OR (US); Sameer Shekhar, Portland, OR (US); Mark Carbone, Cupertino, CA (US); Merwin M. Brown, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 39 days.

(21) Appl. No.: 16/551,523

(22) Filed: Aug. 26, 2019

(65) Prior Publication Data
US 2019/0384367 A1    Dec. 19, 2019

(51) Int. Cl.
| | | |
|---|---|---|
| *G06F 1/32* | (2019.01) | |
| *G06F 1/20* | (2006.01) | |
| *G06F 1/3296* | (2019.01) | |
| *G06F 1/324* | (2019.01) | |
| *G06F 1/3206* | (2019.01) | |

(52) U.S. Cl.
CPC .............. *G06F 1/206* (2013.01); *G06F 1/324* (2013.01); *G06F 1/3206* (2013.01); *G06F 1/3296* (2013.01)

(58) Field of Classification Search
CPC ......................................................... G06F 1/32
USPC ............................................................ 713/320
See application file for complete search history.

(56) References Cited

U.S. PATENT DOCUMENTS

| | | | | |
|---|---|---|---|---|
| 2010/0268930 A1* | 10/2010 | Bose | .................... | G06F 11/3096 713/100 |
| 2010/0268975 A1* | 10/2010 | Bose | .................... | G06F 11/3006 713/340 |
| 2012/0079290 A1* | 3/2012 | Kumar | .................. | G06F 1/3206 713/300 |
| 2012/0110352 A1* | 5/2012 | Branover | .............. | G06F 1/3296 713/300 |
| 2013/0007413 A1* | 1/2013 | Thomson | ................ | G06F 1/324 712/30 |
| 2013/0145188 A1* | 6/2013 | Gloekler | ................. | G06F 1/324 713/322 |
| 2014/0068290 A1* | 3/2014 | Bhandaru | ............. | G06F 1/3243 713/320 |

OTHER PUBLICATIONS

Antony Leather, AMD's 7nm Zen 2 Will Worry Intel by Doubling CPU Core Counts, 2018, Consumer Tech, pp. 5 (Year: 2018).*

* cited by examiner

*Primary Examiner* — Suresh Suryawanshi
(74) *Attorney, Agent, or Firm* — Patent Capital Group

(57) ABSTRACT

Particular embodiments described herein provide for an electronic device that can be configured to include a plurality of chiplets, a plurality of resources, a system thermal engine, and at least one processor. The at least one processor is configured to cause the system thermal engine to monitor the plurality of chiplets, where the plurality of chiplets are part of a multi-chip module, determine that a first chiplet from the plurality of chiplets has reached a threshold temperature, and reduce power to the first chiplet without reducing power to the other chiplets in the plurality of chiplets.

20 Claims, 8 Drawing Sheets

PER CHIPLET THERMAL CONTROL IN A DISAGGREGATED MULTI-CHIPLET SYSTEM

TECHNICAL FIELD

This disclosure relates in general to the field of computing and/or networking, and more particularly, to per chiplet thermal control in a disaggregated multi-chiplet system.

BACKGROUND

Some emerging trends in electronic devices place increasing performance demands on a system. One of the ways to increase performance of a system is to increase the power of processors in the system. However, the increase in power of the processors in the system can cause thermal increases in the system. The thermal increases can cause a reduction in performance of the electronic device.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

Figure 1:
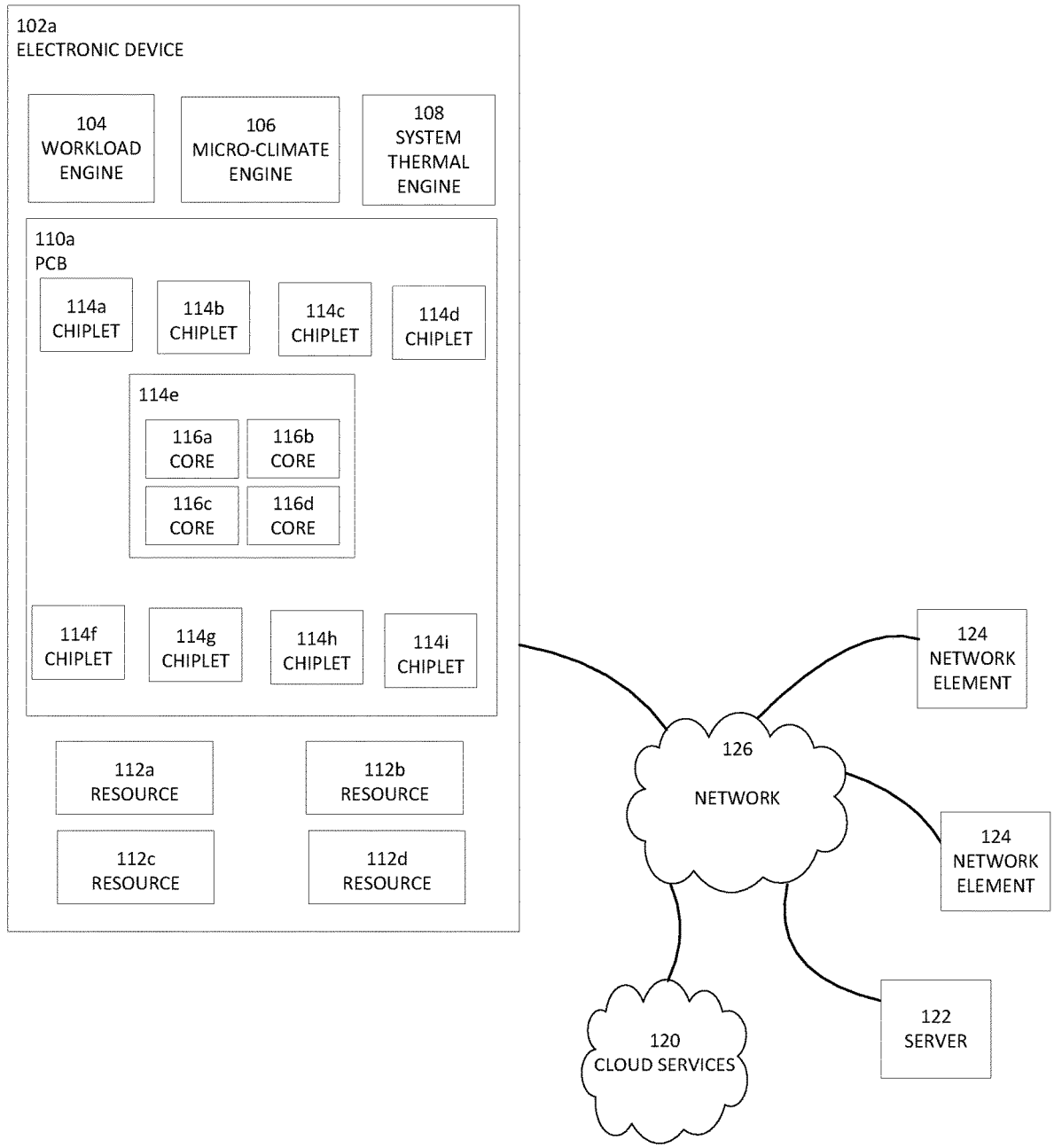
FIG. 1 is a simplified block diagram of a system to enable per chiplet thermal control in a disaggregated multi-chiplet system, in accordance with an embodiment of the present disclosure.

The FIGURES of the drawings are not necessarily drawn to scale, as their dimensions can be varied considerably without departing from the scope of the present disclosure.

DETAILED DESCRIPTION

Example Embodiments

The following detailed description sets forth examples of devices, apparatuses, methods, and systems relating to enabling per chiplet thermal control in a disaggregated multi-chiplet system. The term "chiplet" includes an integrated circuit block (e.g., multiple electronic components interconnected to form a complete electronic function) of a multi-chip module that consists of multiple disaggregated functional integrated circuit blocks. Features such as structure(s), function(s), and/or characteristic(s), for example, are described with reference to one embodiment as a matter of convenience; various embodiments may be implemented with any suitable one or more of the described features.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials, and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

The terms "over," "under," "below," "between," and "on" as used herein refer to a relative position of one layer or component with respect to other layers or components. For example, one layer disposed over or under another layer may be directly in contact with the other layer or may have one or more intervening layers. Moreover, one layer disposed between two layers may be directly in contact with the two layers or may have one or more intervening layers. In contrast, a first layer "on" a second layer is in direct contact with that second layer. Similarly, unless explicitly stated otherwise, one feature disposed between two features may be in direct contact with the adjacent features or may have one or more intervening layers.

Implementations of the embodiments disclosed herein may be formed or carried out on a substrate, such as a non-semiconductor substrate or a semiconductor substrate. In one implementation, the non-semiconductor substrate may be silicon dioxide, an inter-layer dielectric composed of silicon dioxide, silicon nitride, titanium oxide and other transition metal oxides. Although a few examples of materials from which the non-semiconducting substrate may be formed are described here, any material that may serve as a foundation upon which a non-semiconductor device may be built falls within the spirit and scope of the embodiments disclosed herein.

In another implementation, the semiconductor substrate may be a crystalline substrate formed using a bulk silicon or a silicon-on-insulator substructure. In other implementations, the semiconductor substrate may be formed using alternate materials, which may or may not be combined with silicon, that include but are not limited to germanium, indium antimonide, lead telluride, indium arsenide, indium phosphide, gallium arsenide, indium gallium arsenide, gallium antimonide, or other combinations of group III-V or group IV materials. In other examples, the substrate may be a flexible substrate including 2D materials such as graphene and molybdenum disulphide, organic materials such as pentacene, transparent oxides such as indium gallium zinc oxide poly/amorphous (low temperature of dep) III-V semiconductors and germanium/silicon, and other non-silicon flexible substrates. Although a few examples of materials from which the substrate may be formed are described here, any material that may serve as a foundation upon which a semiconductor device may be built falls within the spirit and scope of the embodiments disclosed herein.

In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). Reference to "one embodiment" or "an embodiment" in the present disclosure means that a particular feature, structure, or characteristic described in connection with the embodiment is included in at least one embodiment. The appearances of the phrase "in one embodiment" or "in an embodiment" are not necessarily all referring to the same embodiment. The appearances of the phrase "for example," "in an example," or "in some examples" are not necessarily all referring to the same example.

FIG. 1 is a simplified block diagram of an electronic device 102a configured to enable per chiplet thermal control in a disaggregated multi-chiplet system, in accordance with an embodiment of the present disclosure. In an example, electronic device 102a can include a workload engine 104, a micro-climate engine 106, a system thermal engine 108, a printed circuit board (PCB) 110a, and resources 112a-112d. PCB 110a can include a plurality of chiplets 114a-114i. One or more of chiplets 114a-114i can include a plurality of cores. For example, as illustrated in FIG. 1, chiplet 114e includes cores 116a-116d. Chiplets 114a-114i can be part of a multi-chip module. Generally, a multi-chip module is an electronic assembly where multiple chiplets and/or other discrete components are integrated onto a unifying substrate, such that in use, the multiple chiplets can be treated as if they were a larger integrated circuit.

Each of chiplets 114a-114i can be an integrated circuit block that is part of a chip that consists of multiple chiplets assembled onto a single substrate so that in use, chiplets 114a-114i can be treated as if it were a larger integrated circuit. The term "chiplet" refer to an independent constituent that makes up a large chip built out of multiple smaller chiplets or dies. For example, instead of carving new processors from silicon as single chips, processors can be assembled from multiple smaller pieces of silicon known as chiplets. This provides a disaggregation or separation of logic functions instead of having all the logic functions on one chip or die. Chiplets 114a-114i can have a common heat sink, heat pipe, or some type of thermal solution. Each of resources 112a-112d may be a power supply (e.g., battery), a thermal solution or cooling system or part of a thermal solution or a cooling system (e.g., a fan, heat pipe, etc.), a voltage regulator, an accelerator (e.g., a field programmable gate array (FPGA), graphics processor, graphics card, chip set, CPU, etc.), memory (e.g., solid-state drives (SSDs), random access memory (RAM), dynamic RAM (DRAM), etc.), or some other resource that may be used by one or more chiplets 114a-114i or used to help reduce the temperature of or otherwise help to cool one or more chiplets 114a-114i during the operation of electronic device 102a.

System thermal engine 108 can be configured to determine the system resource budget and focus on per chiplet thermal control in a disaggregated multi-chiplet system. The system resource budget can be the total resource capacity of the system as it related to chiplets 114a-114i. The term "system resource budget" includes the capacity of resources 112a-112d and the thermal capacity of the system as they relate to chiplets 114a-114i (e.g., an amount of heat a heat pipe can effectively transfer, the battery's ability to supply power, a fan's cooling capacity, the power a voltage regulator can supply to the chiplets, etc.). Each of resources 112a-112d have their own resource budget. For example, a battery will have a resource budget based at least on the power it can provide, a fan will have a resource budget based at least on its cooling capacity, etc. In addition, each of resources 112a-112d may have a thermal capacity because with time, as the system draws current from each resource 112a-112d, the temperature or thermal characteristics of each of resources 112a-112d may increase. The system can cool to a certain level and the heat generated from resources 112a-112d and chiplets 114a-114i (along with other factors) can add together and, if left unchecked, will exceed what the system can cool and the system resource budget. In a specific example, a battery may supply all the power to the system and the battery represents one constraint on the system resource budget. For example, some batteries can supply thirty (30) amperes for ten (10) seconds but then the battery needs to limit what power can be drawn out of it for a specific amount of time, otherwise the battery may overheat. The total system resource budget is the budget of the resources and components other than chiplets 114a-114i (e.g., battery, voltage regulator, thermal solution or cooling system, etc.).

In an example, a chiplet in a system starts to provide increased performance and changes to a higher power to use an increased clock frequency or clock rate. As used herein, the term "clock frequency" and "clock rate" are synonymous. The higher power allows for a short duration increase in computing performance through opportunistic overclocking and/or longer opportunistic overclocking duration for increased computing performance. Overclocking is the practice of increasing the clock frequency, often to exceed that certified by the manufacturer. Commonly, the operating voltage is also increased to maintain a component's operational stability at accelerated speeds. Increasing a chiplet's clock frequency causes the chiplet to perform more operations per second, but it also produces additional heat.

As the chiplet starts to provide the increased performance, the temperature of the chiplet starts to rise and can reach a threshold temperature (e.g., one-hundred degrees Celsius 100° C.). The term "threshold temperature" includes a chiplet's thermal limit or the temperature at which the chiplet will throttle or limit power and performance in order to not exceed reliability limits. When the chiplet reaches its threshold temperature, the system throttles the chiplet and starts to limit the power and clock frequency of the chiplet to try and keep the temperature of the chiplet from rising above the threshold temperature or to try and keep the temperature of the chiplet around the threshold temperature. If the power and clock frequency of the chiplet were not throttled, the system could exceed the system resource budget and run out of electronic capability to continue to supply the higher power because the system would become too hot, the battery could run out of capability to provide the required current, etc. The term "throttled" includes limiting the voltage, power, and/or use of a device or element to produce less heat than if the device or element were not throttled.

In some previous systems, when one of the chiplets reaches its threshold temperature, everything is throttled and the system will throttle the current to all the chiplets and stop them from using a higher power. However, the chiplets do not all reach their threshold temperature at the same time and the chiplets need to be treated individually so when one chiplet reaches its threshold temperature, the other chiplets may still have more headroom to operate and they can keep operating at a higher power to use an increased clock frequency and provide increased performance. System thermal engine 108 can manage which chiplets operate at the higher power and for how long to try and maximize overall performance of the chiplets. When one chiplet does reach its threshold temperature and needs to be throttled, system thermal engine 108 can be configured to harvest what is still available on a second chiplet.

Workloads are already going to a chiplet. For example, a workload may be already committed to a first chiplet (e.g., a logic chiplet) and then to a second chiplet (e.g., a graphics chiplet). In some examples, there is a specific order that the execution of a workload requires and the chiplets should not be limited in any sequence of the workload if a chiplet still has the thermal capacity to operate at a higher power to use an increased clock frequency. For example, a first chiplet may prepare data to be processed by a second chiplet. In some current systems, when the first chiplet reaches its threshold temperature, everything, including the second chiplet, is throttled. System thermal engine 108 can be configured to allow the first chiplet (e.g., a logic chiplet) to operate up to its threshold temperature, throttle the first chiplet but not throttle the second chiplet (e.g., a graphics chiplet), and let the second chiplet operate at a higher power, even after the first chiplet reaches its threshold temperature or thermal limit and is throttled.

In some examples, system thermal engine 108 can be configured to favor one chiplet over another and not allow the system to compromise the performance of a second chiplet by consuming the system resource budget on a first chiplet. In an example, each of resources 112a-112d can be intelligently limited at an appropriate time so the system can have needed resources available for one or more specific chiplets. The system resource budget can be allocated and partitioned between two or more chiplets and the allocation may be based on the type of workload or some other factors. In an illustrative example, a first chiplet is going to consume system resources when it is operating. The system knows a second chiplet is going to consume "X" amount of system resources in the near future and the system can be configured such that the first chiplet does not consume the resources needed by the second chiplet so the second chiplet has the resources available when the second chiplet needs the resources.

In an example, if the system knows a workload will require a specific chiplet to have extended activity, system thermal engine 108 can be configured to not allow the other chiplets to consume all of the system resource budget and allocate only a portion of the total system resource budget to the other chiplets. One of the ways to do this is to limit the threshold temperature or thermal limit (Tjmax) so instead of the other chiplets having a first threshold temperature of one-hundred degrees Celsius (100° C.), the system can assign the other chiplets a second lower threshold temperature of ninety-five degrees Celsius (95° C.). More specifically, if the specific chiplet is going to need a battery budget for the higher power to use an increased clock frequency to execute future workloads, system thermal engine 108 can assign a system resource budget to the other chiplets that does not allow the other chiplets to consume the battery budget needed for the second chiplet.

In some examples, instead of being a homogenous package with only "fast" chiplets, "medium" chiplets, or "slow" chiplets with respect to power and clock frequency, the system can allow for different combinations (e.g., chiplets 114a, 114b, and 114e may be "fast" chiplets that operate at a relatively high clock frequency, chiplets 114c, 114d, and 114f may be "medium" chiplets that operate at a lower clock frequency than chiplets 114a, 114b, and 114e, and chiplets 114g-114i may be "slow" chiplets that operate a lower clock frequency than chiplets 114c, 114d, and 114f). Because of the ability to control per chiplet characteristics and per chiplet thermals, the system can make sure each of the chiplets contribute to their maximum or close to maximum potential (e.g., a "fast" chiplet will operate at a relatively high power to use a relatively high clock frequency but will be throttled when it reaches its threshold temperature, while a "medium" chiplet will consume less power and operate at a relatively lower clock frequency and therefore will generate less heat and can operate for a longer time).

Micro-climate engine 106 can be configured to periodically receive and/or determine thermal parameters related to resources 112a-112d that can be used to manage the system resource budget. The term "thermal parameters" includes a measurement, range, indicator, etc. of an element or condition that affects the system resource budget, chiplets, and/or the thermal response, thermal state, and/or thermal transient characteristics of the resources associated with the system resource budget. The thermal parameters of a resource can include one or more chiplet workload intensities, the workload or processing speed of one or more chiplets, fan speed, air temperature (e.g., ambient air temperature, temperature of the air inside the platform, etc.), power dissipation of the resource, or other indicators that may affect the condition of the resource. In an example, the thermal parameters can be weighted and each resource may have a different weight assigned to each thermal parameter. In addition, each resource may have different or similar thermal parameters. For example, the thermal parameters of resource 120a may include a parameter of the temperature of resource 120b with a relatively high weight associated with it while the thermal parameters of resource 120c may not include a parameter of the temperature of resource 120b or may include a parameter of the temperature of resource 120b but with a relatively low weight associated with it.

Workload engine 104 can be configured to determine the effect a workload may have on a chiplet. Workload engine 104 can use previously acquired data related to previous conditions, parameters, workloads, thermal responses, etc. of the system to simulate different workload scenarios. This can be performed for each chiplet in the system and allow for intelligent and strategic disposition of data workload missions to a chiplet with a residency or time duration capability to allow a chiplet to handle a specific workload before chiplet throttling is required.

It is to be understood that other embodiments may be utilized and structural changes may be made without departing from the scope of the present disclosure. Substantial flexibility is provided by electronic device 102a in that any suitable arrangements and configuration may be provided without departing from the teachings of the present disclosure.

Elements of FIG. 1 may be coupled to one another through one or more interfaces employing any suitable connections (wired or wireless), which provide viable pathways for network (e.g., network 126, etc.) communications. Additionally, any one or more of these elements of FIG. 1 may be combined or removed from the architecture based on particular configuration needs. Electronic device 102a may include a configuration capable of transmission control protocol/Internet protocol (TCP/IP) communications for the transmission or reception of packets in a network. Electronic device 102a may also operate in conjunction with a user datagram protocol/IP (UDP/IP) or any other suitable protocol where appropriate and based on particular needs.

For purposes of illustrating certain example techniques of electronic device 102a, the following foundational information may be viewed as a basis from which the present disclosure may be properly explained. End users have more media and communications choices than ever before. A number of prominent technological trends are currently afoot (e.g., more computing devices, more online video services, more Internet traffic), and these trends are changing the media delivery landscape and often require an increased performance of a system. One of the ways to increase performance of a system is to increase the power of processors in the system.

One way to increase the performance or power of a processor is to increase the number of logic elements or transistors on the processor. The number of transistors that can be squeezed onto a piece of silicon had increased on a predictable schedule known as Moore's law, which is based on the observation that the number of transistors in a dense integrated circuit doubles about every two years. Moore's law helped to drive the digital evolution from minicomputers to personal computers to smartphones and the cloud by creating more transistors in each generation of processors, making them more powerful. But, as the smallest features of transistors reached about 14 nanometers, smaller than the tiniest viruses, the industry fell off its self-imposed pace. That slowdown is forcing chipmakers to look for alternate ways to boost performance.

One of the alternative ways chipmakers are using to boost performance is instead of carving new processors from silicon as single chips, chipmakers assemble them from multiple smaller pieces of silicon known as chiplets. Chiplets refer to the independent constituents which make up a large chip built out of multiple smaller chiplets or dies. The need for multiple chips is driven by the reticle limit (i.e., the maximum size a lithography machine can etch) which is dictated by the maximum size of chip that is possible to be fabricated in mass quantity. Designs that exceed the reticle limit need to be split into smaller dies in order to be manufacturable.

Thermal challenges are always present in computer processing units and, as devices and systems are expected to increase performance and function, the problem is growing. However, the increase in performance and/or function causes an increase in the thermal challenges of the system. When alternate ways to boost a computer's performance includes chiplets, increased demands are placed on the chiplets and the chiplets will heat up. As a result, the chiplets will throttle or limit power and performance in order to not reach their threshold temperature and exceed reliability limits. In the first step of functional logic separation to different chiplets (e.g., core logic chiplet, graphics logic chiplet) the vastly different thermal resistance from each chiplet to a common thermal solution as well as the workload of each chiplet will create temperature differences between different chiplets.

In a specific example, a system may operate on a two chiplet system-on-chip (SoC) with a central processor's functions and a graphic processor's functions separated to each chiplet. Starting at time zero, high central processor activity lasts until the central processor's threshold temperature is reached. The system is throttled and the graphics processor's activity is curtailed due to the central processor reaching its threshold temperature even though the temperature of the graphics processor is far below the threshold temperature of the graphics processor. A workload that is graphics processor centric and requires preparatory activity from the central processor suffers in this scenario as most of the system resource budget is taken by the central processor, resulting in negative graphic processor performance. Some current systems will throttle or limit power and performance based on the highest activity chiplet and cannot exploit thermal headroom for each chiplet and therefore often restrict overall performance.

A device to help mitigate the thermal challenges of a system, as outlined in FIG. 1, can resolve these issues (and others). In an example, an electronic device (e.g., electronic device 102a) can be configured to allow for per chiplet thermal control in a disaggregated multi-chiplet system. More specifically, the electronic device can be configured to determine a system resource budget and focus on thermal controls per chiplet level to allow for per chiplet thermal control in a disaggregated multi-chiplet system.

A system thermal engine (e.g., system thermal engine 108) can be configured to analyze a workload and thermal parameters for each resource and/or chiplet that will be used during the workload. A micro-climate engine (e.g., micro-climate engine 106) can be configured to collect or determine at least a portion of the thermal parameters for a plurality of resources and/or chiplets. In an example, a plurality of sensors can be used to determine at least a portion of the thermal parameters of the resources and/or chiplets. The micro-climate engine can continually update at least a portion of the thermal parameters for each resource and/or chiplet according to changing conditions. The thermal parameters from the micro-climate engine can be used by the system thermal engine to create a system resource budget for each chiplet.

A workload engine (e.g., workload engine 104) can be configured to determine a workload for each chiplet. In some examples, the workload engine can determine the effect a workload may have on a chiplet and help determine an advanced predictive time allocation of resources that will be needed by the chiplet for a future workload. Using the workload engine, mission critical data operations can be allocated a portion of the system resource budget that a chiplet needs to complete the mission critical data operations. The workload engine can use predictive and current thermal parameters when allocating the system resource budget to a chiplet. In an example, each resource can include an internal temperature sensor that determines the temperature of the device. The device's temperature is reported to the micro-climate engine. The micro-climate engine reports the device's temperature and other thermal parameters to the system thermal engine.

Individual chiplets can be stressed to their threshold temperature or thermal limit with the system thermal engine managing the differences in thermal resistance and capacity of each chiplet. The total system resource budget can be distributed appropriately between chiplets. For example, the total system resource budget can be allocated based on a local thermal solution for maximum or near maximum thermal capacity utilization. The total system resource budget can be proportional to the thermal capacitance of each chiplet to a common heat sink/heat pipe temperature and higher thermal capacitance chiplets can be allocated a higher system resource budget.

In another example, the total system resource budget can be allocated based on the workload requirement of per chiplet activity. In a two chip SoC with a logic function chiplet and a graphics logic function chiplet, a graphics logic centric workload will cause the graphics logic function chiplet to be allocated a larger share of the total system resource budget and a core logic centric workload will cause the logic function chiplet to be allocated a larger share of the total system resource budget. The total system resource budget allocation will be done by the system thermal engine.

In another example, the total system resource budget can be allocated based on chiplet speed and leakage characteristics with similar function chiplets. Lower speed and leakage chiplets will have longer residencies. This enables a broader distribution chiplet utilization for a multi-chiplet system. For example, a system with identical speed and leakage chiplets, identical distribution of workload, and identical system resource budget allocation will result in all chiplets reaching a threshold temperature at about the same time. In another example, where chiplets of different speeds and/or leakage are on the same SoC (e.g., to consume a broader distribution chiplet pool and provide multiple performance points), the challenge is that different chiplets will dissipate heat at different power levels. More specifically, a faster clock frequency chiplet will dissipate more heat and reach its the threshold temperature earlier than a slower/lower leakage chiplet. Without per chiplet control, the clock frequency for all chiplets would be throttled when the fastest clock frequency chiplet reaches its threshold temperature. The system thermal engine can be configured to use per chiplet thermal control and allow the slower clock frequency chiplets to continue operating unconstrained until their threshold temperatures are reached. This allows a wider distribution of chiplet utilization while helping to maximize performance of the system.

Different chiplets have different residency and clock frequency characteristics based on the workload assigned to the chiplet. For example, graphic centric workloads will have higher graphic chiplet workload requirements (e.g., a graphic chiplet needs a longer residency or amount to time to use a higher power for an increased clock frequency as compared to a logic chiplet) and lower logic workload requirements (e.g., a logic chiplet needs a lower residency or amount to time to use a higher power for an increased clock frequency as compared to a graphic chiplet). In the example of similar functions on each chiplet (e.g., multiple core chiplets with different speeds) the amount of time a chiplet will use a higher power to use an increased clock frequency will be different (e.g., the amount of time will be longer for slower/lower power chiplets as they generate less heat and therefore can operate at the higher power longer). System thermal engine 108 can allow each chiplet to reach its threshold temperature before its power and clock frequency is reduced.

Turning to the infrastructure of FIG. 1, electronic device 102*a* in accordance with an example embodiment is shown. Generally, the system may be implemented in any type or topology of networks. Network 126 represents a series of points or nodes of interconnected communication paths for receiving and transmitting packets of information that propagate through the system. Network 126 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In the system, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Messages through the network could be made in accordance with various network protocols, (e.g., Ethernet, Infiniband, OmniPath, etc.). Additionally, radio signal communications over a cellular network may also be provided in the system. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. The data may help determine a status of a network element or network. Additionally, messages, requests, responses, and queries are forms of network traffic, and therefore, may comprise packets, frames, signals, data, etc.

In an example implementation, electronic device 102*a* is meant to encompass a computer, a personal digital assistant (PDA), a laptop or electronic notebook, a cellular telephone, an iPhone, an IP phone, network elements, network appliances, servers, routers, switches, gateways, bridges, load balancers, processors, modules, or any other device, component, element, or object that includes at least a plurality of chiplets. Electronic device 102*a* may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information. Electronic device 102*a* may be virtual or include virtual elements.

In regards to the internal structure associated with electronic device 102*a*, electronic device 102*a* can include memory elements for storing information to be used in the operations outlined herein. Electronic device 102*a* may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in electronic device 102*a* could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, elements of electronic device 102a may include software modules (e.g., workload engine 104, micro-climate engine 106, system thermal engine 108, chiplet thermal engine 128, etc.) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, electronic device 102a may include one or more processors that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read-only memory (EPROM), an electrically erasable programmable read-only memory (EEPROM)) or an ASIC that includes digital logic, software, code, electronic instructions, or any suitable combination thereof. Any of the potential processing elements, modules, and machines described herein should be construed as being encompassed within the broad term 'processor.'

Figure 2:
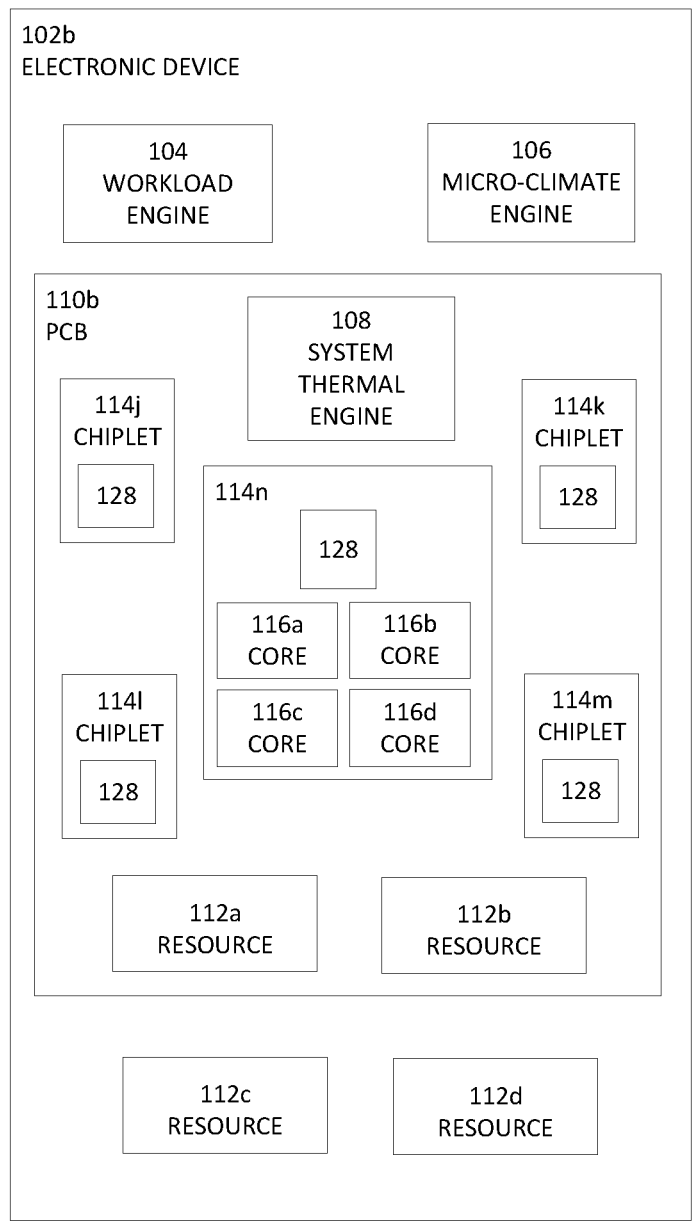
FIG. 2 is a simplified block diagram of a system to enable per chiplet thermal control in a disaggregated multi-chiplet system, in accordance with an embodiment of the present disclosure.

Turning to FIG. 2, FIG. 2 is a simplified block diagram of a portion of electronic device 102b. In an example, electronic device 102b can include workload engine 104, micro-climate engine 106, system thermal engine 108, PCB 110b, and resources 112a-112d. PCB 110b can include plurality of chiplets 114j-114n. In an example, as illustrated in FIG. 2, PCB 110b can also include one or more resources (e.g., resources 112a and 112b). One or more of chiplets 114j-114n can include a plurality of cores. For example, as illustrated in FIG. 2, chiplet 114n includes cores 116a-116d. Each of plurality of chiplets 114j-114n can include a chiplet thermal engine 128.

Figure 4:
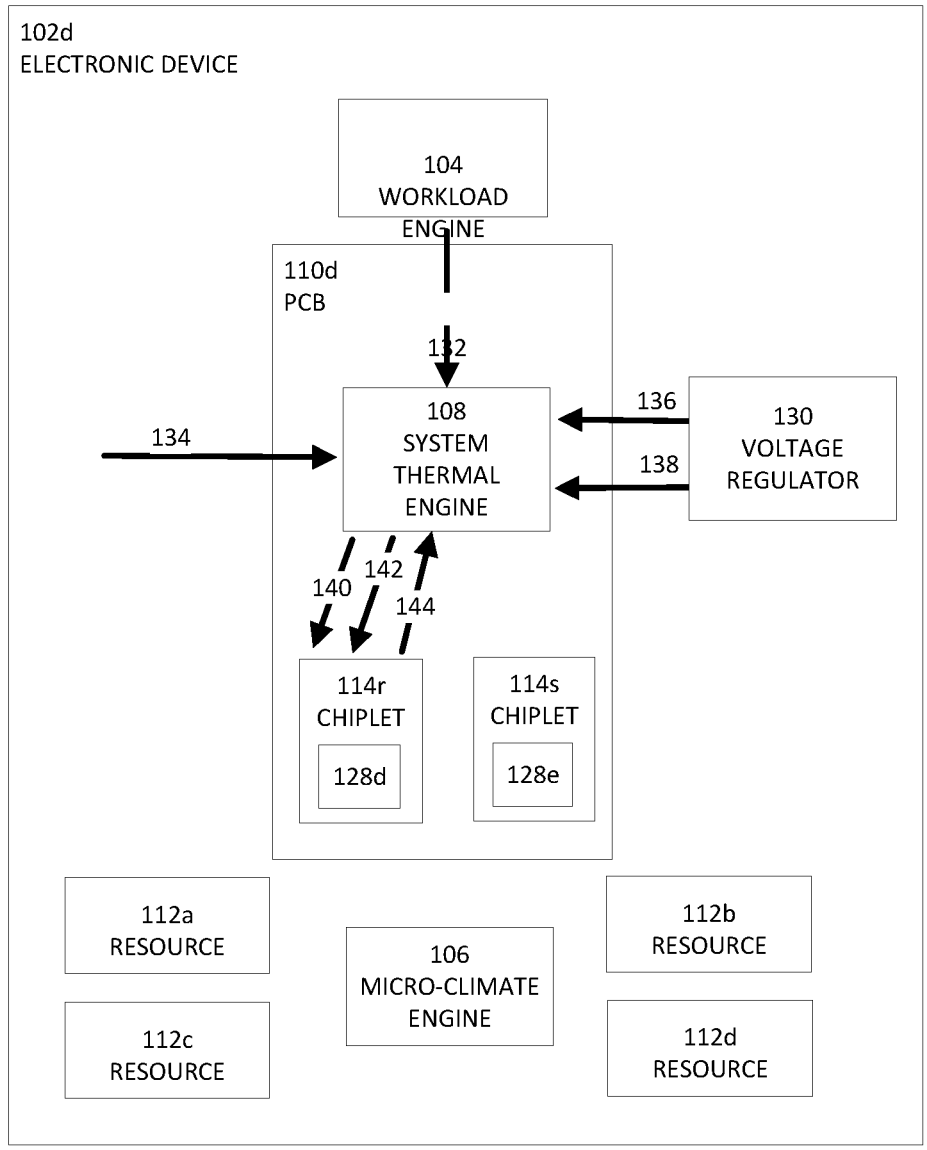
FIG. 4 is a simplified block diagram of a portion of a system to enable per chiplet thermal control in a disaggregated multi-chiplet system, in accordance with an embodiment of the present disclosure.

System thermal engine 108 can receive workload requests from workload engine 104, system constrains from the BIOS of electronic device 102b, and real-time measurements from a voltage regulator (e.g., voltage regulator 130 illustrated in FIG. 4). For example, workload engine 104 can send a signal to system thermal engine 108 that indicates the system will execute a workload related to a photo editing program and that the workload related to the photo editing program needs specific parameters (e.g., one or more chiplets need to operate at a specific clock frequency). System thermal engine 108 can generate a voltage and clock frequency request for each of the chiplets that will be involved during the execution of the workload related to the photo editing program. System thermal engine 108 can receive clock frequency requests, system limits, workload awareness, etc. when allocating resources between the different chiplets. Each chiplet thermal engine 128 can be configured to communicate with system thermal engine 108. When a chiplet reaches its threshold temperature, the chiplet thermal engine associated with the chiplet can send a signal to system thermal engine 108 that the chiplet cannot satisfy the voltage and clock frequency request and will send back a clock frequency that the chiplet will be able to operate at without exceeding the chiplet's threshold temperature.

Figure 3:
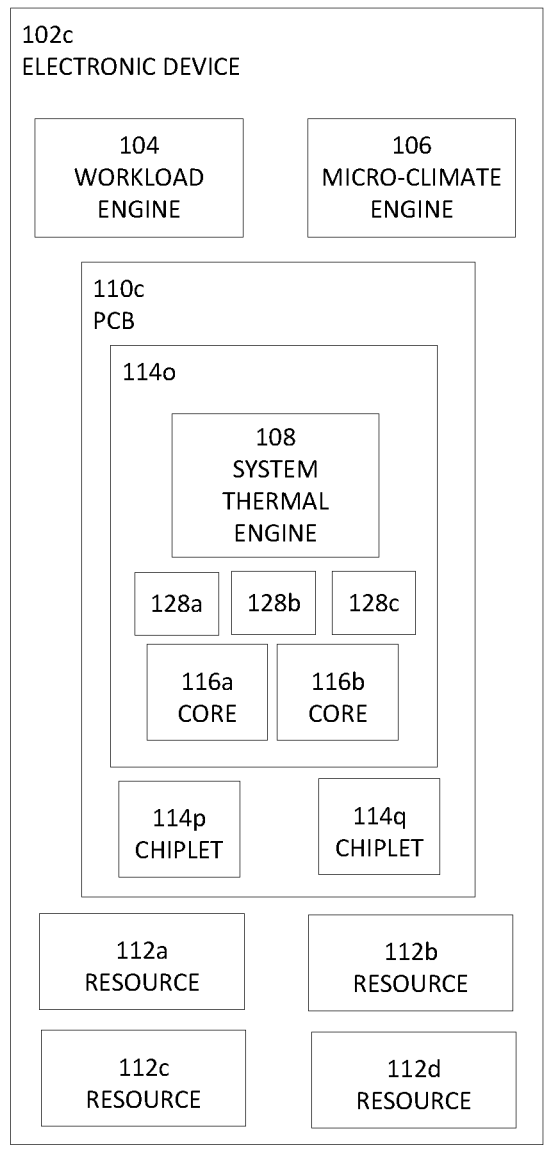
FIG. 3 is a simplified block diagram of a system to enable per chiplet thermal control in a disaggregated multi-chiplet system, in accordance with an embodiment of the present disclosure.

Turning to FIG. 3, FIG. 3 is a simplified block diagram of a portion of electronic device 102c. In an example, electronic device 102c can include workload engine 104, micro-climate engine 106, PCB 110c, and resources 112a-112d. PCB 110c can include system thermal engine 108 and plurality of chiplets 114o-114q. One or more of chiplets 114o-114q can include a plurality of cores. For example, as illustrated in FIG. 3, chiplet 114o includes cores 116a and 116b. In an example, one chiplet from plurality of chiplets 114o-114q can include system thermal engine 108 and a plurality of chiplet thermal engines where each of the plurality of chiplet thermal engines correspond to a chiplet. For example, chiplet thermal engine 128a can correspond to chiplet 114o, chiplet thermal engine 128b can correspond to chiplet 114p, and chiplet thermal engine 128c can correspond to chiplet 114q.

Turning to FIG. 4, FIG. 4 is a simplified block diagram of a portion of electronic device 102d. In an example, electronic device 102d can include workload engine 104, micro-climate engine 106, PCB 110d, resources 112a-112d, and voltage regulator 130. PCB 110d can include system thermal engine 108 and plurality of chiplets 114r and 114s. Each of plurality of chiplets 114r and 114s can include a chiplet thermal engine. For example, chiplet 114r can include chiplet thermal engine 128d and chiplet 114s can include chiplet thermal engine 128e. Chiplet 114r may be a logic chiplet and chiplet 114s may be a graphics chiplet.

In an example, system thermal engine 108 can receive a current and/or future workload indicator 132 from workload engine 104. System thermal engine 108 can also receive an indicator of system constrains 134 (e.g., from the BIOS of electronic device 102d) and a DC load line indicator 136 and a monitored current indicator 138 from voltage regulator 130. In a specific example, system thermal engine 108 can use the value represented by DC load line indicator 136 (e.g., the DC load line (DCLL)), the value represented by monitored current indicator 138 (e.g., the monitored current from the voltage regulator (Imon)), and the voltage set point of the voltage regulator (Vid) to determine the total power that can be used by chiplets 114r and 114s (e.g., total power=Imon*(VID−DCLL*Imon).

System thermal engine 108 can allocate the power to each chiplet (e.g., chiplet 114r can use 10 amperes for 5 second, chiplet 114s can use 10 amperes for 8 seconds, etc.) and send a power allocation indicator 140 and a voltage and clock frequency request 142 to each of chiplets 114r and 114s. Each chiplet thermal engine can receive a voltage and clock frequency request 142 from system thermal engine 108 and communicate a response 144 back to system thermal engine. Response 144 can be an acknowledgement that the chiplet can satisfy the requested voltage and clock frequency in voltage and clock frequency request 142 or may be a response that the chiplet cannot satisfy the requested voltage and clock frequency in voltage and clock frequency request 142 and response 144 can include a voltage and clock frequency that the chiplet can satisfy. For example, system thermal engine 108 may send voltage and clock frequency request 142 to chiplet 114r but chiplet 114r may be close to or have reached its threshold temperature and therefore cannot satisfy the requested voltage and clock frequency in voltage and clock frequency request 142. Chiplet thermal engine 128d can send response 144 that includes a voltage and/or clock frequency value that the chiplet can operate at with without reaching or exceeding its threshold temperature.

Figure 5:
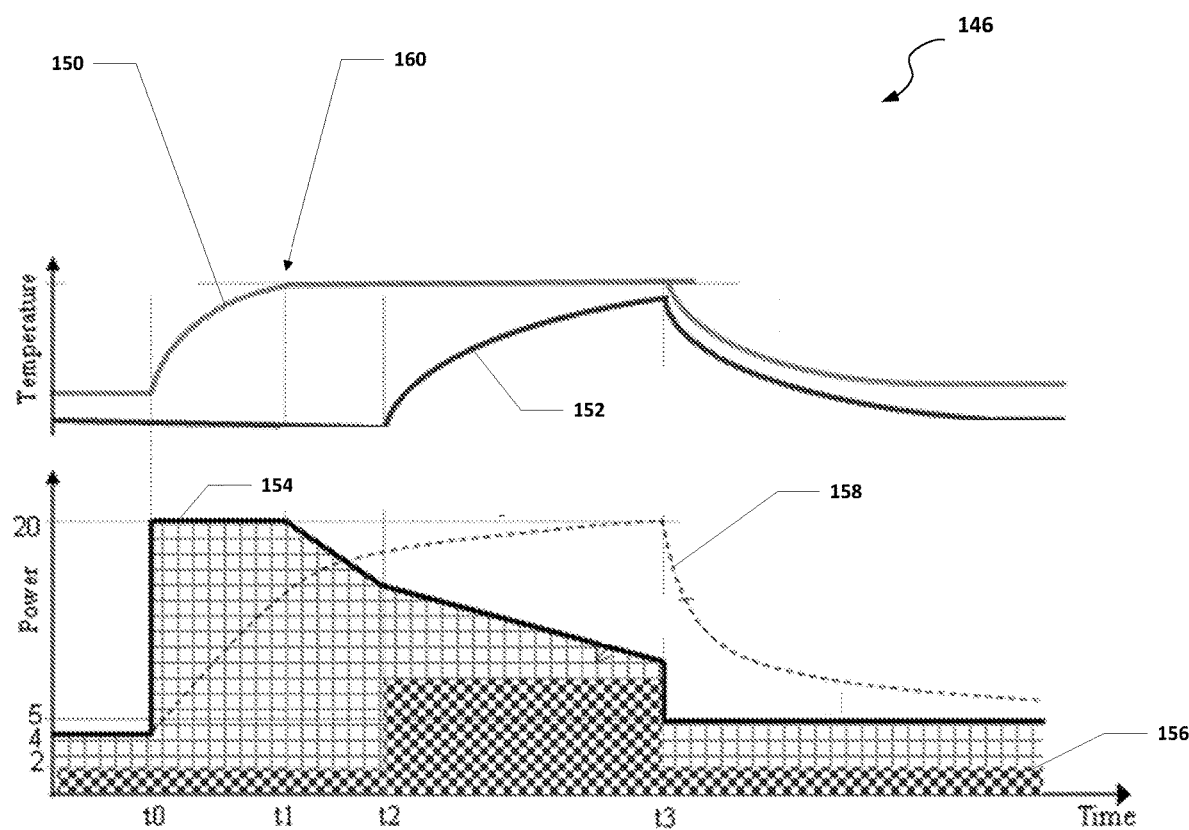
FIG. 5 is a simplified graph illustrating example details that may be associated with the system in accordance with an embodiment.

Turning to FIG. 5, FIG. 5 is a simplified graph 146 illustrating example details of per chiplet thermal control in a disaggregated multi-chiplet system, in accordance with an embodiment of the present disclosure. First chiplet temperature line 150 in graph 146 represents a temperature of a first chiplet over time, second chiplet temperature line 152 represents a temperature of a second chiplet over time, first chiplet power level line 154 represents a power level of the first chiplet over time, second chiplet power level line 156 represents a power level of the second chiplet over time, and total system power line 158 represents the total system power of a system that includes the first chiplet and the second chiplet.

As illustrated in graph 146, the first chiplet increases in power and the temperature of the first chiplet increases. At time t1, first chiplet temperature line 150 reaches a threshold temperature 160 for the first chiplet. In some systems, the entire system would be throttled but as illustrated by second chiplet temperature line 152, the second chiplet has not reached its threshold temperature. System thermal engine 108 (not shown) can throttle the first chiplet but not the second chiplet and because the second chiplet has not reached its threshold temperature, the second chiplet can be allowed to increase its power to use an increased clock frequency. This allows the total system power, as illustrated by total system power line 158, to keep increasing even after the first chiplet has reached its threshold temperature.

In a specific illustrative example, a graphics chiplet is allowed higher activity after a logic chiplet has reached its threshold temperature. The net effect is higher activity on the graphics chiplet and can result in a higher performance by the system for workloads needing more graphics chiplet activity as compared to logic chiplet activity. In some examples, the graphics chiplet is allowed a steady medium activity level and does not reach its threshold temperature. This can help to ensure a steady frame rate performance as opposed to a high frame rate that may become reduced to a user perceptible low frame rate when the logic chiplet and graphics chiplet are throttled and/or the logic chiplet unnecessarily consumes resources needed by the graphics chiplet.

Figure 6:
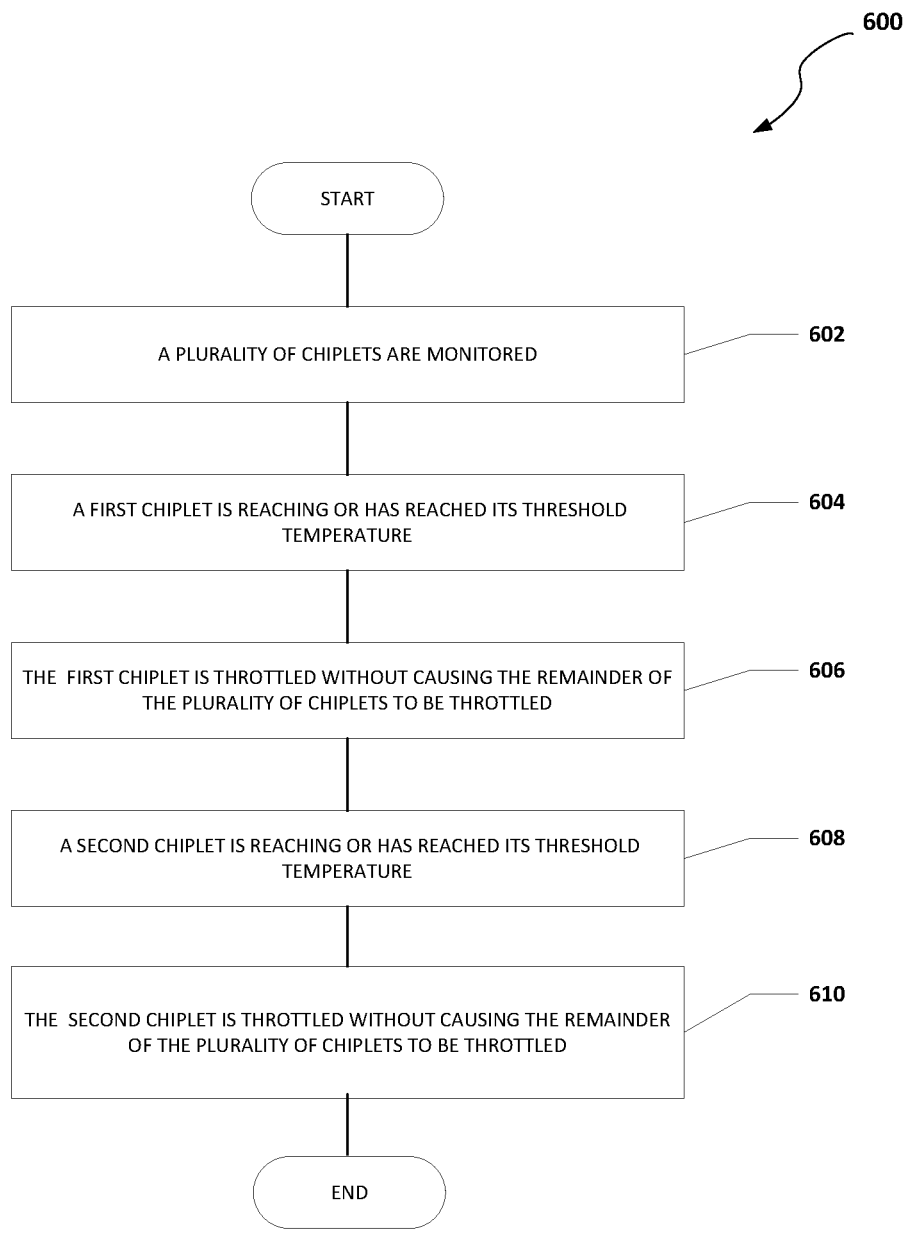
FIG. 6 is a simplified flowchart illustrating potential operations that may be associated with the system in accordance with an embodiment.

Turning to FIG. 6, FIG. 6 is an example flowchart illustrating possible operations of a flow 600 that may be associated with enabling per chiplet thermal control in a disaggregated multi-chiplet system, in accordance with an embodiment. In an embodiment, one or more operations of flow 600 may be performed by workload engine 104, micro-climate engine 106, system thermal engine 108, and chiplet thermal engine 128. At 602, a plurality of chiplets are monitored. At 604, a first chiplet is reaching or has reached its threshold temperature. At 606, the first chiplet is throttled without causing the reminder of the plurality of chiplets to be throttled. At 608, a second chiplet is reaching or has reached its threshold temperature. At 610, the second chiplet is throttled without causing the reminder of the plurality of chiplets to be throttled.

Figure 7:
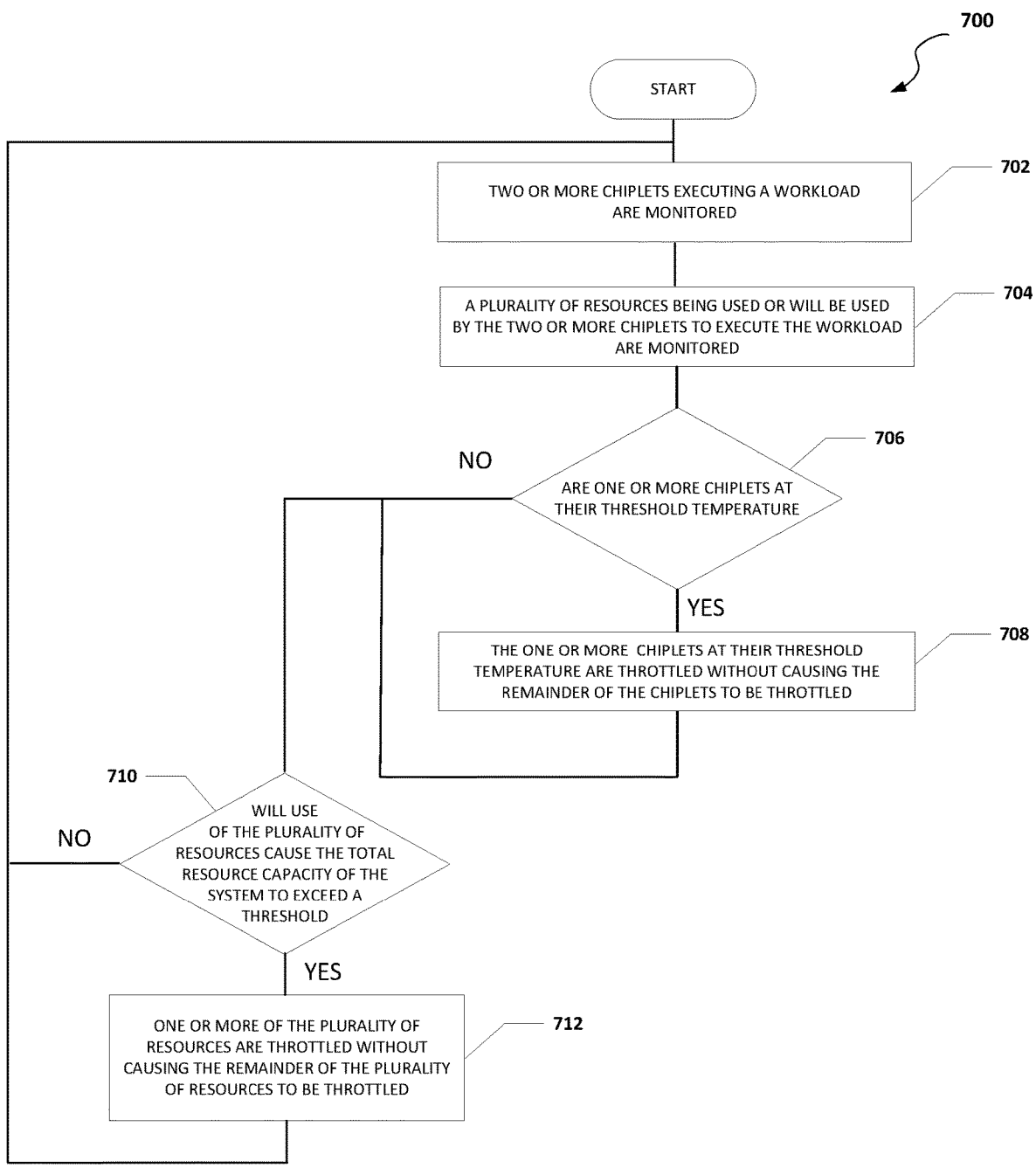
FIG. 7 is a simplified flowchart illustrating potential operations that may be associated with the system in accordance with an embodiment.

Turning to FIG. 7, FIG. 7 is an example flowchart illustrating possible operations of a flow 700 that may be associated with enabling per chiplet thermal control in a disaggregated multi-chiplet system, in accordance with an embodiment. In an embodiment, one or more operations of flow 700 may be performed by workload engine 104, micro-climate engine 106, system thermal engine 108, and chiplet thermal engine 128. At 702, two or more chiplets executing a workload are monitored. At 704, a plurality of resources being used or will be used by the two or more chiplets to execute the workload are monitored. At 706, the system determines if one or more chiplets are at their threshold temperature. If one or more chiplets are at their threshold temperature, then the one or more chiplets at their threshold temperature are throttled without causing the remainder of the chiplets to be throttled, as in 708. At 710, the system determines if use of the plurality of resources will cause the total resource capacity of the system to exceed a threshold. For example, the system may determine if use of the plurality of resources will cause the total resource capacity of the system to exceed a system resource budget. Going back to 706, if one or more chiplets are not at their threshold temperature, then the system determines if use of the plurality of resources will cause the total resource capacity of the system to exceed a threshold, as in 710. If use of the plurality of resources will cause the total resource capacity of the system to exceed a threshold, then one or more of the plurality of resources are throttled without causing the remainder of the plurality of resources to be throttled, as in 712. If use of the plurality of resources will not cause the total resource capacity of the system to exceed a threshold, then the system returns to 702 and two or more chiplets executing a workload are monitored.

Figure 8:
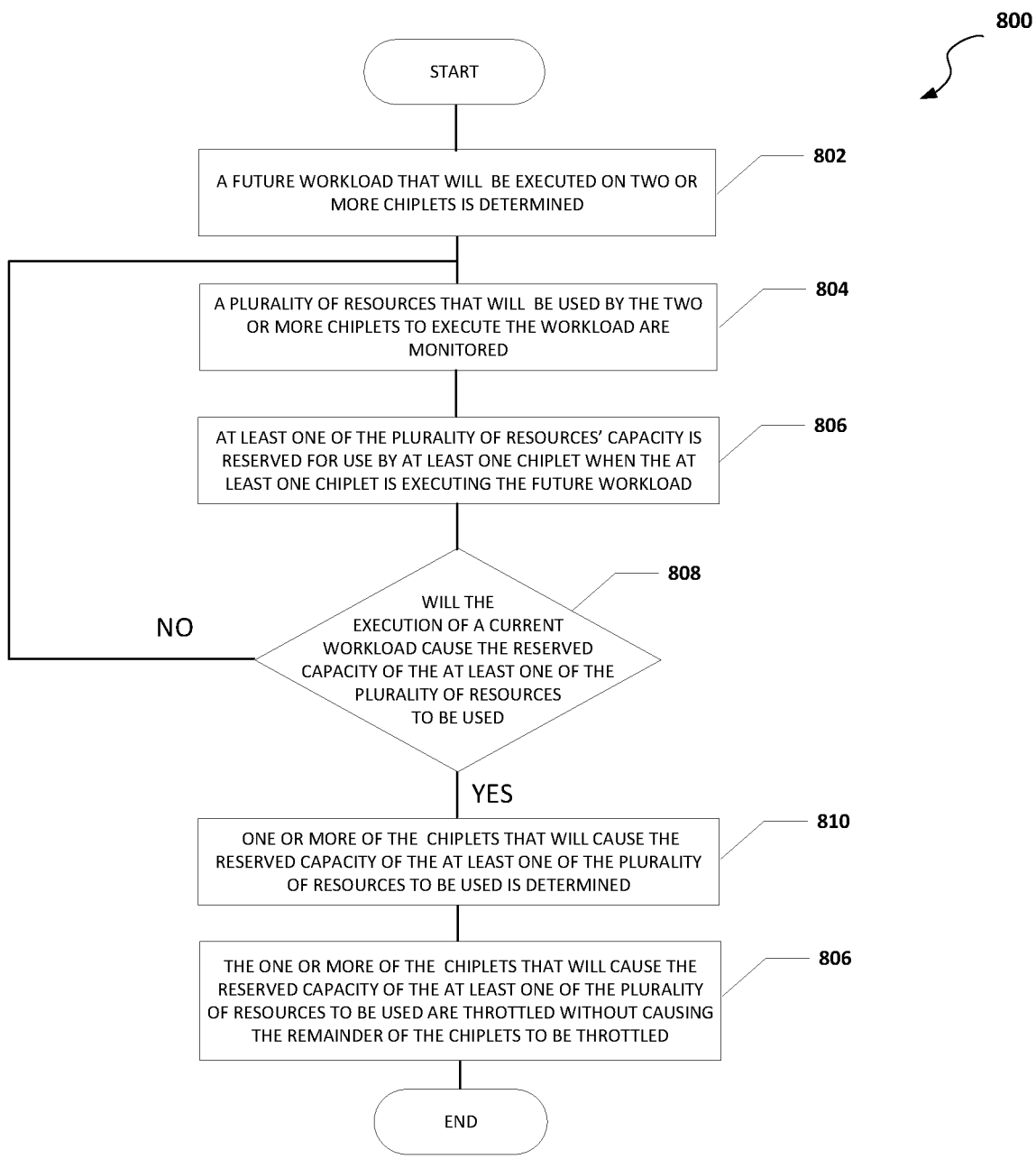
FIG. 8 is a simplified flowchart illustrating potential operations that may be associated with the system in accordance with an embodiment.

Turning to FIG. 8, FIG. 8 is an example flowchart illustrating possible operations of a flow 800 that may be associated with enabling per chiplet thermal control in a disaggregated multi-chiplet system, in accordance with an embodiment. In an embodiment, one or more operations of flow 800 may be performed by workload engine 104, micro-climate engine 106, system thermal engine 108, and chiplet thermal engine 128. At 802, a future workload that will be executed on two or more chiplets is determined. At 804, a plurality of resources that will be used by the two or more chiplets to execute the workload are monitored. At 806, at least one of the plurality of resources' capacity is reserved for use by at least one chiplet when the at least one chiplet is executing the future workload. At 808, the system determines if the execution of a current workload will cause the reserved capacity of the at least one of the plurality of resources to be used. If the execution of a current workload will not cause the reserved capacity of the at least one of the plurality of resources to be used, then the system returns to 804 and a plurality of resources that will be used by the two or more chiplets to execute the workload are monitored. If the execution of a current workload will cause the reserved capacity of the at least one of the plurality of resources to be used, then one or more of the chiplets that will cause the reserved capacity of the at least one of the plurality of resources to be used is determined, as in 810. At 812, the one or more of the chiplets that will cause the reserved capacity of the at least one of the plurality of resources to be used are throttled without causing the remainder of the chiplets to be throttled.

It is also important to note that the operations in the preceding flow diagrams (i.e., FIGS. 6-8) illustrate only some of the possible correlating scenarios and patterns that may be executed by, or within, electronic devices 102a-102d. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by electronic devices 102a-102d in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although electronic devices 102a-102d have been illustrated with reference to particular elements and operations that facilitate the communication process, these elements and operations may be replaced by any suitable architecture, protocols, and/or processes that achieve the intended functionality of electronic devices 102a-102d.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Other Notes and Examples

Example A1, is an electronic device including a plurality of chiplets, where the plurality of chiplets are part of a multi-chip module, a system thermal engine, and at least one processor. The at least one processor is configured to cause the system thermal engine to monitor the plurality of chiplets, determine that a first chiplet from the plurality of chiplets has reached a threshold temperature, and reduce power to the first chiplet without reducing power to other chiplets in the plurality of chiplets.

In Example A2, the subject matter of Example A1 can optionally include a first chiplet thermal engine, where the first chiplet thermal engine communicates a clock frequency value to the system thermal engine that will allow the first chiplet to operate without further exceeding the threshold temperature.

In Example A3, the subject matter of any one of Examples A1-A2 can optionally include where one or more of the plurality of chiplets includes a plurality of cores.

In Example A4, the subject matter of any one of Examples A1-A3 can optionally include where the threshold temperature is a thermal limit of the first chiplet.

In Example A5, the subject matter of any one of Examples A1-A4 can optionally include where the first chiplet is a logic chiplet.

In Example A6, the subject matter of any one of Examples A1-A5 can optionally include where the at least one processor is further configured to cause the system thermal engine to determine that a second chiplet from the plurality of chiplets has reached a threshold temperature and reduce power to the second chiplet without reducing power to the other chiplets in the plurality of chiplets.

Example C1 is at least one machine readable storage medium having one or more instructions that when executed by at least one processor, cause the at least one processor to determine a workload to be executed by a plurality of chiplets, where the plurality of chiplets are part of a multi-chip module, monitor one or more resources to be used by the plurality of chiplets during execution of the workload, determine that a first chiplet from the plurality of chiplets will consume one or more resources needed by a second chiplet during execution of the workload, and reduce power to the first chiplet without reducing power to other chiplets in the plurality of chiplets, where the power reduction to the first chiplet causes the first chiplet to not consume the one or more resources needed by the second chiplet during execution of the workload.

In Example C2, the subject matter of Example C1 can optionally include where one of the one or more resources needed by the second chiplet during execution of the workload is a power supply resource.

In Example C3, the subject matter of any one of Examples C1-C2 can optionally include where the one or more instructions further cause the at least one processor to determine that a third chiplet from the plurality of chiplets has reached a threshold temperature and reduce power to the third chiplet without reducing power to the other chiplets in the plurality of chiplets.

In Example C4, the subject matter of any one of Examples C1-C3 can optionally include where the first chiplet is a logic chiplet.

In Example C5, the subject matter of any one of Examples C1-C4 can optionally include where the second chiplet is a graphics chiplet.

Example S1 is a system for enabling a thermal chiplet control in a disaggregated multi-chiplet system. The system can include memory, a plurality of chiplets, where the plurality of chiplets are part of a multi-chip module, and a system thermal engine. The system thermal engine is configured to monitor the plurality of chiplets, determine that a first chiplet from the plurality of chiplets has reached a threshold temperature, and reduce voltage to the first chiplet without reducing voltage to other chiplets in the plurality of chiplets.

In Example S2, the subject matter of Example S1 can optionally include where the first chiplet includes a first chiplet thermal engine, where the first chiplet thermal engine communicates a clock frequency value to the system thermal engine that will allow the first chiplet to operate without further reaching the threshold temperature.

In Example S3, the subject matter of any one of the Examples S1-S2 can optionally include where the first chiplet is a logic chiplet and a second chiplet is a graphics chiplet.

In Example S4, the subject matter of any one of the Examples S1-S3 can optionally include where the system thermal engine is further configured to determine a workload to be executed by the plurality of chiplets, monitor one or more resources to be used by the plurality of chiplets during execution of the workload, determine that a third chiplet from the plurality of chiplets will consume one or more resources needed by a second chiplet during execution of the workload, and reduce voltage to the third chiplet without reducing voltage to the other chiplets in the plurality of chiplets, where the voltage reduction to the third chiplet causes the third chiplet to not consume the one or more resources needed by the second chiplet during execution of the workload.

In Example S5, the subject matter of any one of the Examples S1-S4 can optionally include where the system thermal engine is further configured to determine that a second chiplet from the plurality of chiplets has reached a threshold temperature and reduce voltage to the second chiplet without reducing power to the other chiplets in the plurality of chiplets.

Example M1 is a method including monitoring a first chiplet and a second chiplet, where the first chiplet and the second chiplet are part of a multi-chip module, determining that the first chiplet has reached a threshold temperature, and reducing power to the first chiplet without reducing power to the second chiplet.

In Example M2, the subject matter of Example M1 can optionally include where the first chiplet is a logic chiplet and the second chiplet is a graphics chiplet.

In Example M3, the subject matter of any one of the Examples M1-M2 can optionally include where the first chiplet includes a first chiplet thermal engine, where the first chiplet thermal engine communicates a clock frequency value to a system thermal engine that will allow the first chiplet to operate without further exceeding the threshold temperature.

In Example M4, the subject matter of any one of the Examples M1-M3 can optionally include where the threshold temperature is a thermal limit of the first chiplet.

Example AA1 is an apparatus including means for determining a workload to be executed by a plurality of chiplets, where the plurality of chiplets are part of a multi-chip module, means for monitoring one or more resources to be used by the plurality of chiplets during execution of the workload, means for determining that a first chiplet from the plurality of chiplets will consume one or more resources needed by a second chiplet during execution of the workload, and means for reducing power to the first chiplet without reducing power to other chiplets in the plurality of chiplets, where the power reduction to the first chiplet causes the first chiplet to not consume the one or more resources needed by the second chiplet during execution of the workload.

In Example AA2, the subject matter of Example AA1 can optionally include where one of the one or more resources needed by the second chiplet during execution of the workload is a power supply resource.

In Example AA3, the subject matter of any one of Examples AA1-AA2 can optionally include means for determining that a third chiplet from the plurality of chiplets has reached a threshold temperature and means for reducing power to the third chiplet without reducing power to the other chiplets in the plurality of chiplets.

In Example AA4, the subject matter of any one of Examples AA1-AA3 can optionally include where the first chiplet is a logic chiplet.

In Example AA5, the subject matter of any one of Examples AA1-AA4 can optionally include.

Example X1 is a machine-readable storage medium including machine-readable instructions to implement a method or realize an apparatus as in any one of the Examples A1-A6, AA1-AA5, or M1-M4. Example Y1 is an apparatus comprising means for performing any of the Example methods M1-M4. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. An electronic device comprising:
   a plurality of chiplets that are part of a multi-chip module, wherein at least two of the plurality of chiplets have different clock rates and at least one of the plurality of chiplets includes a plurality of cores;
   at least one processor, wherein the at least one processor is configured to
   monitor the plurality of chiplets;
   determine that a first chiplet from the plurality of chiplets has reached a threshold temperature;
   reduce power to the first chiplet without reducing power to other chiplets in the plurality of chiplets;
   monitor one or more resources to be used by the plurality of chiplets during execution of a workload;
   determine that a third chiplet from the plurality of chiplets will consume one or more resources needed by a second chiplet during execution of the workload; and
   reduce voltage to the third chiplet without reducing voltage to the other chiplets in the plurality of chiplets, wherein the voltage reduction to the third chiplet causes the third chiplet to not consume an amount of the one or more resources that is needed by the second chiplet during execution of the workload.

2. The electronic device of claim 1, further comprising a first chiplet thermal engine, wherein the first chiplet thermal engine communicates a clock frequency value to a system thermal engine that will allow the first chiplet to operate without further exceeding the threshold temperature.

3. The electronic device of claim 1, wherein the threshold temperature is a thermal limit of the first chiplet and the threshold temperature is different than a thermal limit of a second chiplet from the plurality of chiplets.

4. The electronic device of claim 1, wherein the first chiplet is a logic chiplet.

5. The electronic device of claim 1, wherein the at least one processor is further configured to cause a system thermal engine to:
   determine that a second chiplet from the plurality of chiplets has reached a threshold temperature; and
   reduce power to the second chiplet without reducing power to the other chiplets in the plurality of chiplets.

6. At least one non-transitory machine readable medium comprising one or more instructions that, when executed by at least one processor, causes the at least one processor to:
   determine a workload to be executed by a plurality of chiplets, wherein the plurality of chiplets are part of a multi-chip module, wherein one or more of the plurality of chiplets includes a plurality of cores and at least two of the plurality of chiplets have different clock rates;
   monitor the plurality of chiplets and one or more resources to be used by the plurality of chiplets during execution of the workload;
   determine that a first chiplet from the plurality of chiplets has reached a threshold temperature;

reduce power to the first chiplet without reducing power to other chiplets in the plurality of chiplets;

determine that a third chiplet from the plurality of chiplets will consume one or more resources needed by a second chiplet during execution of the workload; and reduce voltage to the third chiplet without reducing voltage to the other chiplets in the plurality of chiplets, wherein the voltage reduction to the third chiplet causes the third chiplet to not consume an amount of the one or more resources that is needed by the second chiplet during execution of the workload.

7. The at least one machine readable medium of claim 6, wherein one of the one or more resources needed by the second chiplet during execution of the workload is a power supply resource.

8. The at least one machine readable medium of claim 6, wherein the one or more instructions further cause the at least one processor to:

determine that a third chiplet from the plurality of chiplets has reached a threshold temperature; and reduce power to the third chiplet without reducing power to the other chiplets in the plurality of chiplets.

9. The at least one machine readable medium of claim 6, wherein the first chiplet is a logic chiplet.

10. The at least one machine readable medium of claim 9, wherein the second chiplet is a graphics chiplet.

11. A system for enabling thermal control of a chiplet in a disaggregated multi-chiplet system, the system comprising:

memory;

a plurality of chiplets, wherein the plurality of chiplets are part of a multi-chip module and at least two of the plurality of chiplets have different clock rates; and a system thermal engine, wherein the system thermal engine is configured to:

determine a workload to be executed by the plurality of chiplets;

monitor the plurality of chiplets;

determine that a first chiplet from the plurality of chiplets has reached a threshold temperature;

reduce voltage to the first chiplet without reducing voltage to other chiplets in the plurality of chiplets;

monitor one or more resources to be used by the plurality of chiplets during execution of the workload;

determine that a third chiplet from the plurality of chiplets will consume one or more resources needed by a second chiplet during execution of the workload; and reduce voltage to the third chiplet without reducing voltage to the other chiplets in the plurality of chiplets, wherein the voltage reduction to the third chiplet causes the third chiplet to not consume an amount of the one or more resources that is needed by the second chiplet during execution of the workload.

12. The system of claim 11, wherein the first chiplet includes a first chiplet thermal engine, wherein the first chiplet thermal engine communicates a clock frequency value to the system thermal engine that will allow the first chiplet to operate without further reaching the threshold temperature.

13. The system of claim 11, wherein the first chiplet is a logic chiplet and a second chiplet is a graphics chiplet.

14. The system of claim 11, wherein the system thermal engine is further configured to:

determine that a second chiplet from the plurality of chiplets has reached a threshold temperature; and reduce voltage to the second chiplet without reducing power to the other chiplets in the plurality of chiplets.

15. A method comprising:

monitoring a first chiplet and a second chiplet, wherein the first chiplet and the second chiplet are part of a multi-chip module that includes a plurality of chiplets, wherein at least one chiplet from the plurality of chiplets has a clock rate that is different from other chiplets in the plurality of chiplets and one or more of the plurality of chiplets includes a plurality of cores;

determining that the first chiplet has reached a threshold temperature;

reducing power to the first chiplet without reducing power to the second chiplet;

monitoring one or more resources to be used by the plurality of chiplets during execution of a workload;

determining that a third chiplet from the plurality of chiplets will consume one or more resources needed by a second chiplet during execution of the workload; and reducing voltage to the third chiplet without reducing voltage to the other chiplets in the plurality of chiplets, wherein the voltage reduction to the third chiplet causes the third chiplet to not consume an amount of the one or more resources that is needed by the second chiplet during execution of the workload.

16. The method of claim 15, wherein the first chiplet is a logic chiplet and the second chiplet is a graphics chiplet.

17. The method of claim 15, wherein the first chiplet includes a first chiplet thermal engine, wherein the first chiplet thermal engine communicates a clock frequency value to a system thermal engine that will allow the first chiplet to operate without further exceeding the threshold temperature.

18. The method of claim 15, wherein the threshold temperature is a thermal limit of the first chiplet.

19. The electronic device of claim 1, wherein at least two of the plurality of chiplets in the multi-chip module have different sized process nodes.

20. The electronic device of claim 1, wherein the plurality of chiplets are connected using a die-to-die interconnect scheme.

* * * * *

UNITED STATES PATENT AND TRADEMARK OFFICE
CERTIFICATE OF CORRECTION

PATENT NO. : 11,175,709 B2
APPLICATION NO. : 16/551523
DATED : November 16, 2021
INVENTOR(S) : Amit Kumar Jain et al.

Page 1 of 1

It is certified that error appears in the above-identified patent and that said Letters Patent is hereby corrected as shown below:

In the Claims

In Column 18, Claim 1, Line 18, delete "at least" and insert -- and at least --, therefor.

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*